United States Patent
Kenney et al.

(10) Patent No.: US 9,578,681 B2
(45) Date of Patent: Feb. 21, 2017

(54) METHODS AND ARRANGEMENTS FOR A LOW POWER DEVICE IN WIRELESS NETWORKS

(71) Applicant: Intel Corporation, Santa Clara, CA (US)

(72) Inventors: Thomas J. Kenney, Portland, OR (US); Eldad Perahia, Portland, OR (US); Minyoung Park, Portland, OR (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/730,998

(22) Filed: Dec. 29, 2012

(65) Prior Publication Data

US 2014/0185502 A1 Jul. 3, 2014

(51) Int. Cl.
 *H04B 1/38* (2015.01)
 *H04W 88/02* (2009.01)
 *H04W 52/02* (2009.01)
 *H04L 1/00* (2006.01)
 *H04L 25/02* (2006.01)
 (Continued)

(52) U.S. Cl.
 CPC ........... *H04W 88/02* (2013.01); *H04L 1/0015* (2013.01); *H04L 1/0023* (2013.01); *H04W 52/028* (2013.01); *H04L 25/0226* (2013.01); *H04L 27/18* (2013.01); *H04W 8/22* (2013.01); *H04W 84/12* (2013.01)

(58) Field of Classification Search
 CPC .................................................... H04W 74/04
 USPC ........................................................ 370/311
 See application file for complete search history.

(56) References Cited

U.S. PATENT DOCUMENTS 7,474,878 B1    1/2009 Hietala et al.
2002/0158801 A1* 10/2002 Crilly et al. ................. 342/378
(Continued)

FOREIGN PATENT DOCUMENTS

WO    2006038085 A1    4/2006
WO    2014/105209 A1   7/2014

OTHER PUBLICATIONS

International Search Report and Written Opinion received for Patent Application No. PCT/US2013/048814, mailed on Sep. 30, 2013, 9 pages.
(Continued)

*Primary Examiner* — Wei Zhao
(74) *Attorney, Agent, or Firm* — Schubert Law Group PLLC (57) ABSTRACT

Some new low power architecture devices may, e.g., be associated with in a new device category in the IEEE 802.11ah Standard for devices with low power architecture. Some new low power architecture devices may only to support a subset of modulation and coding schemes (MCSs). Some new low power architecture devices negotiate the use of the subset of MCSs with an access point. Further new low power architecture devices address power consumption through modifications to the architecture of the new low power device. For instance, many new low power architecture devices remove, modify or bypass portions of the front-end transmitter circuitry and/or the front-end receiver circuitry such as a power amplifier, a low noise amplifier, predistortion circuitry, digital-to-analog and analog-to-digital converter resolutions, and stages of filtering.

23 Claims, 6 Drawing Sheets

(51) Int. Cl.
  *H04L 27/18* (2006.01)
  *H04W 8/22* (2009.01)
  *H04W 84/12* (2009.01)

(56) References Cited

U.S. PATENT DOCUMENTS

| | | |
|---|---|---|
| 2003/0223509 A1 | 12/2003 | Ma |
| 2007/0076581 A1* | 4/2007 | Tanaka .................. 370/203 |
| 2007/0149237 A1 | 6/2007 | Russell et al. |
| 2007/0257999 A1* | 11/2007 | Chou .................. H03F 1/0277 348/300 |
| 2012/0201213 A1 | 8/2012 | Banerjea et al. |
| 2012/0201315 A1 | 8/2012 | Zhang et al. |
| 2012/0263090 A1 | 10/2012 | Porat et al. |
| 2012/0302180 A1* | 11/2012 | Rofougaran .................. 455/73 |
| 2013/0015989 A1* | 1/2013 | Iso et al. .................. 341/120 |
| 2013/0022083 A1* | 1/2013 | Vasseur et al. ............... 375/132 |
| 2013/0344912 A1 | 12/2013 | Kopikare et al. |

OTHER PUBLICATIONS

International Preliminary Report on Patentability and Written Opinion Received for PCT Patent Application No. PCT/US2013/048814, mailed on Jul. 9, 2015, 6 pages.

Extended European Search Report received for EP Patent Application No. 13866788.6, mailed on Apr. 28, 2016, 17 pages.

3GPP: "3rd Generation Partnership Project; Technical Specification Group Radio Access Network; Study on provision of low-cost MTC UEs based on LTE; (Release 11:", 3GPP Draft; R1-123075_36888-200, 3rd Generation Partnership Project (3GPP), Mobile Competence Centre; 650, Route Des Lucioles; F-06921 Sophia-Antipois Cedex; France, Jun. 11, 2012, XP050601305, 43 pages.

Vermani, Sameer et al., Preamble Format for 1 MHz, submission to: IEEE doc.: 802.11-11/1482r2, dated Nov. 7, 2011, 30 pages.

* cited by examiner

METHODS AND ARRANGEMENTS FOR A LOW POWER DEVICE IN WIRELESS NETWORKS

BACKGROUND

Embodiments are in the field of wireless communications. More particularly, embodiments are in the field of a new low power device architecture and operation.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

In Institute of Electrical and Electronic Engineers (IEEE) 802.11ah systems, the operational bandwidths defined are one megahertz (MHz) and a set of down-clocked IEEE 802.11ac bandwidths, namely 2, 4, 8 and 16 MHz, where the down clocking is 10×. The 1 MHz rate is not derived from the IEEE 802.11n/ac bandwidth, and thus this mode is being designed more or less independently. The 1 MHz system uses a 32-point fast Fourier transform (FFT) as opposed to the minimum of a 64-point FFT in IEEE 802.11ac devices). Of those 32 subcarriers, 24 will be used for data and 2 for pilot. Additionally, a 2× repetition mode is being included, which provides for longer range communications, which doubles the number of symbols by adding a second short training field, a second long training field, a second signal field. And, in many embodiments, a low rate payload mode using binary phase shift keying (BPSK) with 2× repetition is also being introduced, again for lower power and/or range extension.

The identified target applications for IEEE 802.11ah devices are indoor and outdoor sensors and cellular offloading. It is likely that the main application will be sensor networks, and there will be a focus on low power sensor devices that meet very tight power requirements. In most instances the payload is anticipated to be small (hundreds of bytes) for these sensors. With the inclusion of sensor devices into the 802.11 family of devices, the new requirement of very low power consumption will lead to novel architectures and has led to the embodiments of the new low power architecture device described herein. Embodiments may have power requirements whereby the sensor device needs to operate for months and even years without replacing the battery. Additionally, the batteries in these applications will also be small, either AA/AAA or a coin type batteries.

Embodiments may comprise methods and arrangements related to a new low power architecture device. Some embodiments may, e.g., be associated with in a new device category in the IEEE 802.11ah Standard. This new category defines operation of sensors devices with low power architecture. Many embodiments may define a category of sensor devices that need only to support a subset of modulation and coding schemes (MCSs) for, e.g., IEEE 802.11ah. In several embodiments, these MCSs may comprise all single stream, and consist of BPSK with code rate 1/2 using the 2 times repetition (henceforward referred to as MCS0 rep 2 mode), then MCS 0 (BPSK, code rate 1/2), MCS 1 (QPSK, code rate 1/2) and MCS 2 (QPSK, code rate 3/4).

Other embodiments may support all required MCS's (MCS0-7) for, e.g., IEEE 802.11ah, but may operate in the reduced MCS set once negotiated with an access point (AP). In such embodiments, the MAC logic of the low power architecture device may negotiate a subset of the MCS's through a configuration/capabilities exchange where the low power architecture device may signal to the AP a preference or configuration to operate within the reduced MCS set.

Further embodiments address power consumption through modifications to the architecture of the new low power device. For instance, many embodiments remove, modify or bypass portions of the front-end transmitter circuitry and/or the front-end receiver circuitry. With regard to the transmitter circuitry, many embodiments remove or bypass the power amplifier in the transmit chains. Distortion caused by the power amplifier leads to stringent digital and/or analog filtering requirements as well as partly dictating the digital-to-analog (D/A) size. The power amplifier becomes non-linear when operated in power efficient regions. Thus, many devices combat power amplifier distortions through the use of stringent filtering and operating with a high fidelity signal (high D/A precision), or through the use of predistortion of the signal prior to the power amplifier via predistortion circuitry in transmit chains of the front end of transmitter.

Many embodiments implement architecture that does not include predistortion circuitry, implements lower levels of both digital and analog filtering and implements lower resolution D/A's. In other embodiments, the low power architecture device may operates both in the traditional context, with a power amplifier, new architecture without a power amplifier, and all the traditional circuitry would be included on the standard device. However, such embodiments may be designed to bypass the power amplifier, reduce the resolution of the D/A, and bypass or otherwise reduce the number of stages of the analog and digital filters.

For the receiver, further embodiments may remove, (or bypass depending on the device requirements) the receivers Low Noise Amplifier (LNA). In addition, in many embodiments, the receiver may use lower resolution analog-to-digital converters (A/D's) and filters. In the case of the LNA, the device also is a major contributor to receive signal distortion such as intermodulation products. Eliminating or bypassing the LNA allows relaxation of other components.

Many embodiments may target the home or small office environment. As will be shown in FIG. 1B, the link budget for the proposed architecture provides coverage that is currently attained with a IEEE 802.11g/n 2.4 GHz device. Additionally, embodiments may provide a longer range than currently afforded with a 5 GHz device. Some embodiments may utilize sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Various embodiments may be designed to address different technical problems associated with lowering power consumption of devices. For instance, some embodiments may be designed to address one or more technical problems such as reducing the complexity of the circuitry needed to support communications, reducing internal distortions that increase the complexity of supportive circuitry, maintaining an ability to perform the complex communications, and the like.

Different technical problems such as those discussed above may be addressed by one or more different embodiments. For instance, some embodiments that address lowering power consumption of devices may do so by one or more different technical means such as defining a subset of MCSs for communications, eliminating usage of a power amplifier in the transmission chain, eliminating usage of a low noise amplifier in the reception chain, eliminating the usage of predistortion circuitry, operating at a lower D/A resolution, operating with less digital and analog filtering and the like.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may integrate low power wireless communications like Bluetooth®, wireless local area networks (WLANs), wireless metropolitan area networks (WMANs), wireless personal area networks (WPAN), cellular networks, Institute of Electrical and Electronic Engineers (IEEE) IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf), communications in networks, messaging systems, and smart-devices to facilitate interaction between such devices. Furthermore, some wireless embodiments may incorporate a single antenna while other embodiments may employ multiple antennas.

While some of the specific embodiments described below will reference the embodiments with specific configurations such as the focus on the 1 MHz operation of the IEEE 802.11ah system. The embodiments presented here are also implemented in the 2, 4, 8 and 16 MHz modes, but the 1 MHz mode is targeted for the discussion and those of skill in the art will realize that embodiments of the present disclosure may advantageously be implemented with other configurations with similar issues or problems.

Figure 1:
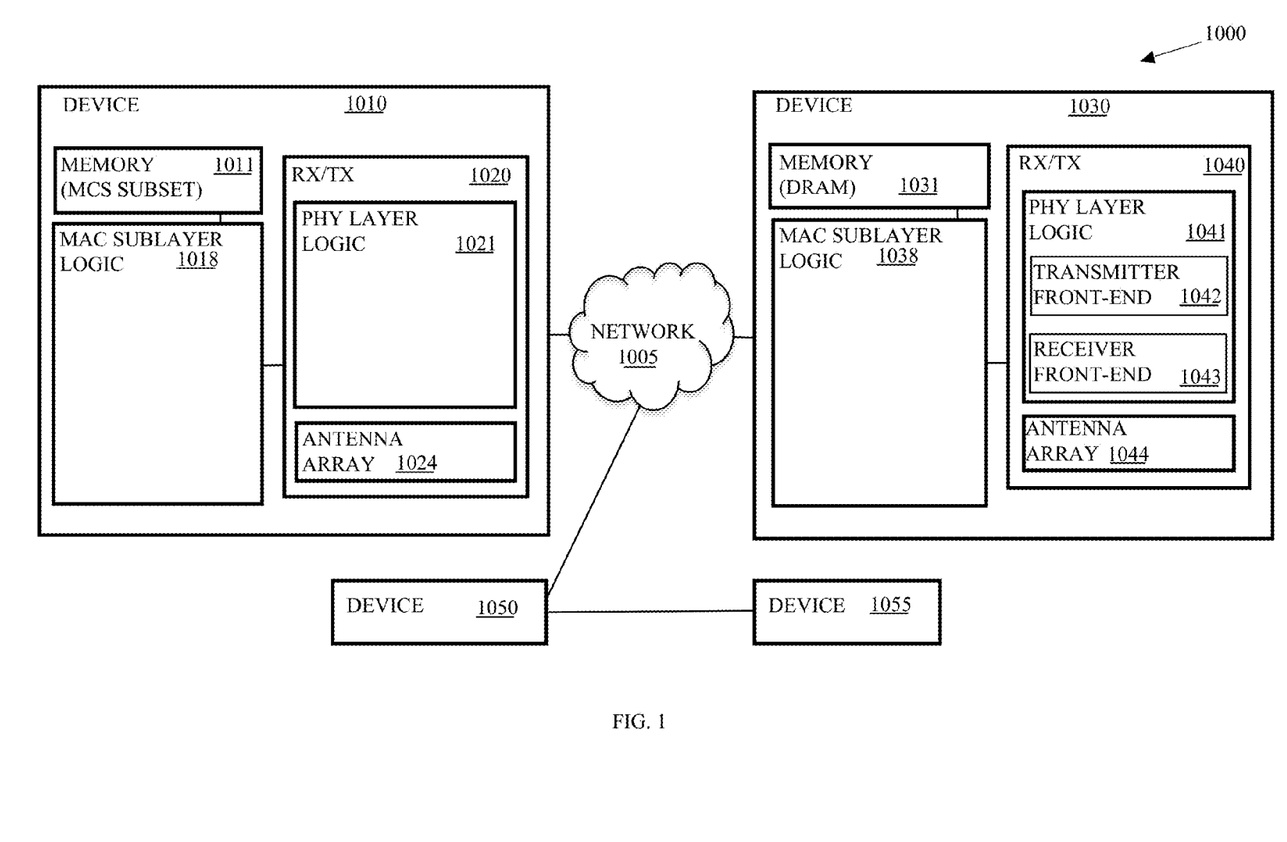
FIG. 1 depicts an embodiment of an example wireless network comprising a plurality of communications devices, including multiple fixed or mobile communications devices.

Turning now to FIG. 1, there is shown an embodiment of a wireless communication system 1000. The wireless communication system 1000 comprises a communications device 1010 that is wire line or wirelessly connected to a network 1005. The communications device 1010 may communicate wirelessly with a plurality of communication devices 1030, and 1050 via the network 1005. The communications devices 1010, 1030, and 1050, and 1055 may comprise a sensor, a station, an access point, a hub, a switch, a router, a computer, a laptop, a notebook, a cellular phone, a PDA (Personal Digital Assistant), or another wireless-capable device. Thus, communications devices may be mobile or fixed. For example, the communications device 1010 may comprise a wireless local area network (LAN) router and to interconnect sensors such as the communications devices 1030, 1050, and 1055 spread about a home or small office. For instance, the sensors may measure the moisture content of plants, measure the humidity, measure the temperature, measure the power consumption by devices, measure the water usage, monitor for rain, or the like.

Periodically, the communications device 1030 may initiate communications with the communications device 1010 to upload sensor data or for maintenance. In other embodiments, the communications device 1030 may only respond to communications and may not comprise logic that initiates communications.

Figure 1A:
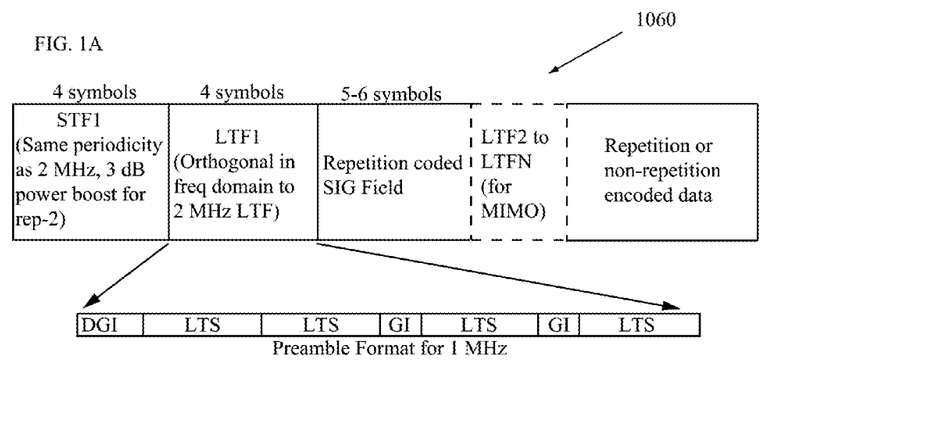
FIG. 1A depicts an embodiment of a packet structure including a preamble format for a 1 MHz bandwidth Institute of Electrical and Electronic Engineers (IEEE) 802.11ah device.

When initially set up, the communications device 1030 may detect a beacon transmitted by the communications device 1010, generated by the medium access control (MAC) sublayer logic 1018 of the communications device 1010, and encapsulated with a preamble such as the preamble format 1060 for the IEEE 802.11ah 1 MHz system illustrated in FIG. 1A. While other embodiments may implement bandwidths other than 1 MHz, the communications device 1030 may implement the 1 MHz bandwidth mode of operation with the 32 point fast Fourier transform (FFT) rather than the 64 point FFT, offering less complexity and potentially less power consumption.

The preamble format 1060 may comprise a short training field (STF) with 2 times repetition at the 1 MHz bandwidth, meaning that two STF sequences may be transmitted in the preamble. The preamble format 1060 may comprise a long training field (LTF) that is illustrated at a double guard interval (DGI) followed by two long training sequences (LTSs), a guard interval (GI), another LTS, another GI, and another LTS. The LTF may be followed by a signal field, additional LTFs for multiple input, multiple output operation, and the data payload.

The communications device 1030 may respond to the beacon with an association request. In some embodiments, the communications device 1030 may indicate as a capability or configuration, that a subset of the standard modulation and coding schemes (MCS) are supported. The standard MCS may comprise MCS 0 through MCS 7. The communications device 1030 may indicate, for instance, that the communications device 1030 supports only single stream that consist of binary phase shift keying (BPSK) with code rate 1/2 using the 2× repetition (henceforward referred to as MCS0 rep 2 mode), an MCS 0 (BPSK, code rate 1/2), an MCS 1 (quadrature phase shift keying (QPSK) with a code rate 1/2) and an MCS 2 (QPSK with a code rate 3/4).

In such embodiments, the communications device 1030 may comprise a new, very low power consumption architecture evident in the transmitter front-end 1042 and, in some embodiments, the receiver front-end 1043 of the physical layer (PHY) transceiver (RX/TX) 1040. For example, the transmitter front end 1042 may operate without a power amplifier in the transmit chains. Without the power amplifier, distortions normally introduced into the transmissions by the power amplifier are not present so the transmitter may also operate without predistortion circuitry in the transmit chains of the transmitter front end 1042. In several of these embodiments, the communications device 1030 may also operate with a low resolution digital-to-analog and a reduced number of stages for the digital and analog filters in the transmit chains of the transmitter front end 1042. In some embodiments, the absence of the power amplifier, predistortion circuitry, high resolution digital-to-analog converter, and/or stages of filtering may relax the specifications for other components and thus may allow for power consumption reduction in other components of the transmitter front-end 1042.

In some embodiments, the communications device 1030 may operate without a Low Noise Amplifier (LNA) in the receive chains of the receiver front end 1043. In addition, the communications device 1030 would use lower resolution A/D's and filters in the receive chains of the receiver front end 1043. Furthermore, the LNA may be a major contributor to receive signal distortion such as intermodulation products. Removing the LNA allows relaxation of other components as in the case of the power amplifier for the transmitter.

In other embodiments, the communications device 1030 may be configured to select an MCS from the subset of MCSs when available but may be capable of operating with any of the standard MCSs, MCS 0 through MCS 7. In such embodiments, the MAC sublayer logic 1038 may respond with an association request that signals to the communications device 1010 that the communication device 1030 prefers to operate within the subset of MCSs. In several embodiments, the communications device 1010 may accept the subset of MCSs and may respond with an affirmative indication in, e.g., an association response. In other embodiments, the communications device 1030 may transmit another management frame to negotiate the usage of the subset of the MCSs such as a probe or a power-saving poll, or the like.

After receiving an affirmative response from the communications device 1010 to communicate with MCSs in the subset, the communications device 1030 may begin receiving communications with MCSs in the subset and the transmitter front end 1042 and/or the receiver front end 1043 may implement a low power mode in which the transmitter front-end 1042 may bypass the power amplifier, bypass the predistortion circuitry, turn off stages of filtering, and reduce the resolution of the D/A's to reduce power consumption. In some embodiments, the receiver front end 1043 may also reduce power consumption by bypassing the low noise amplifier, turning off stages of filtering, and reducing the A/D resolution in the receive chains. In other embodiments, the MAC logic 1038 may instruct the low power logic of the receiver front end to enter a low power mode and/or instruct the low power logic of the transmitter to enter a low power mode.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a wireless router and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, and 1050. Communications device 1050 may be a second sensor transmitting data to the communications device 1010. Communications device 1055 may be, e.g., a sensor communicatively coupled with the communications device 1010 and may be sufficiently near communications devices 1030 and 1050 to detect transmissions from communications devices 1030 and 1050.

The communication devices 1010 and 1030 comprise memory 1011 and 1031, and Media Access Control (MAC) sublayer logic 1018 and 1038, respectively. The memory 1011, 1031 such as Dynamic Random Access Memory (DRAM) may store the frames, preambles, and preamble structures, or portions thereof. The frames, also referred to as MAC layer Protocol Data Units (MPDUs), and the preamble structures may establish and maintain synchronized communications between the transmitting device and the receiving device.

The MAC sublayer logic 1018, 1038 may generate the frames and the physical layer logic 1041 may encapsulate the frames with preambles such as the preamble 1060 in FIG. 1A to generate physical layer data units (PPDUs). For instance, the communications device 1030 may be integrated with a sensor that makes measurements of the environment in the vicinity of the communications device 1030 and may transmit a packet including data related to the measurements to communications device 1010. In response, communications device 1010 may transmit an acknowledgement to communications device 1030 indicating receipt of the packet of data.

The communications devices 1010, 1030, 1050, and 1055 may each comprise a transceiver (RX/TX) such as transceivers (RX/TX) 1020 and 1040. Each transceiver 1020, 1040 comprises a radio comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom. FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

The transceivers (RX/TX) 1020 and 1040 may comprise physical (PHY) layer logic 1021 and 1041, respectively. The physical (PHY) layer logic 1021, 1041 may comprise logic to enter a low power mode as well as logic to exit the low power mode.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols by the front-end of the transmitter during transmission to avoid inter-symbol interference (ISI), which might result from multi-path distortion.

In one embodiment, the communications device 1010 optionally comprises a Digital Beam Former (DBF). The DBF transforms information signals into signals to be applied via the radio to elements of an antenna array 1024. The antenna array 1024 is an array of individual, separately excitable antenna elements. The signals applied to the elements of the antenna array 1024 cause the antenna array 1024 to radiate, e.g., one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF.

Figure 1B:
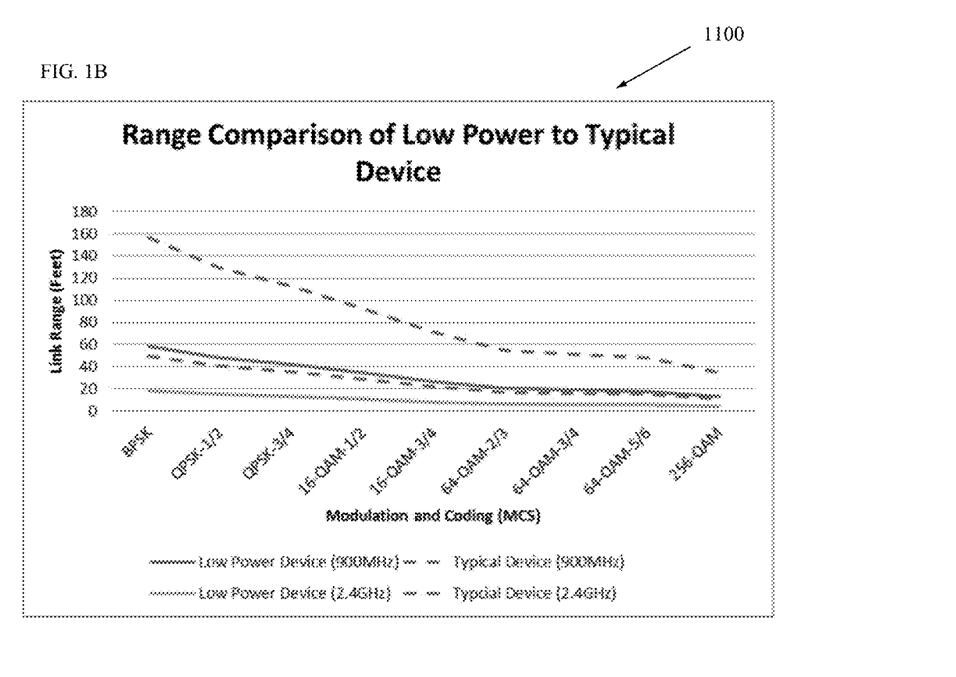
FIG. 1B depicts an embodiment of a link range versus modulation and coding scheme (MCS) comparison between a new low power architecture device and a typical device at 900 megahertz (MHz) and 2.4 gigahertz (GHz)

FIG. 1B depicts an embodiment of a graph 1100 of a link range versus modulation and coding scheme (MCS) comparison between a new low power architecture device and a typical device at 900 megahertz (MHz) and 2.4 gigahertz (GHz). FIG. 1B provides a breakdown of the link distance for 4 different configurations as a function of MCS. There are two devices, a typical device, one without the modifications operating with a power amplifier in the transmitter front end operating with a transmission power of 15 decibels per milliwatt (dBm), and a new Low Power architecture device that is operating with an embodiment of the new architecture. The link budget is computed for both the 2.4 GHz and the 900 MHz to show relative performance. As seen in the figure, the 900 MHz link provides significant increase in range for the "typical device". The interesting point is that when the typical 2.4 MHz device is compared to the low power 900 MHz device, the two provide comparable link budgets and therefore provide nearly the same coverage. Additionally, if a 5 GHz device were shown, the 900 MHz would be much better. Keeping in mind that a nominal transmission output power of 15 dBm was assumed for the typical device, and for the Low power device we assume the power consumption is equivalent to a device operating at 0 dBm. Higher powers are possible, but 15 dBm was assumed here under the assumption that sensor devices would be designed to minimize cost and power consumption. It was also chosen to provide a fair comparison to the battery life analysis to follow.

Figure 1C:
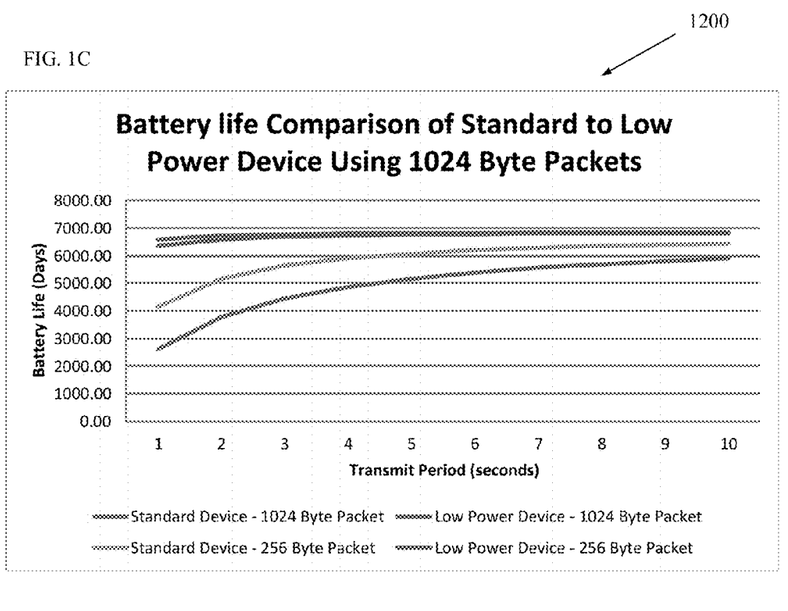
FIG. 1C depicts an embodiment of a comparison of battery life between a standard device to a new low power architecture device with 256 and 1024 byte packets.

FIG. 1C depicts an embodiment of a graph 1200 of a comparison of battery life between a standard device to a new low power architecture device with 256 and 1024 byte packets. An analysis was done to compare the gains afforded from a power consumption perspective using the new low power architecture device. In the comparison, the two devices are compared in terms of battery life (assuming a AA battery (1600 milli-Ampere Hour (mAHr)), in a few scenarios. The typical device is assumed to have a power amplifier operating at a nominal output of 15 dBm, an low noise amplifier and the appropriate A/D, D/A and filters to support such operation across all data rates. The embodiment of the new low power device has no power amplifier, low noise amplifier, and a smaller A/D and D/A. For the analysis no reduction in filtering is assumed. Thus no gains in power consumption are assumed for the filtering reduction. It is assumed this is a small gain and while useful, it was decided to not include in the analysis.

The system parameters for the analysis was a sensor implemented using 14 nanometer (nm) process, it assumes a sleep mode power consumption of 0.01 milliwatt (mW), for this case it assumes BPSK data with 1/2 code rate, the payloads plotted are both 256 and 1025 Bytes, with a received acknowledgement (ACK) of 14 Bytes. For the analysis, the transmit period was swept from 1 to 10 minutes. The device wakes up every transmit interval (from 1 to 10 minutes) sends the data and waits and receives and ACK then goes to sleep.

FIG. 1C shows the results comparing the standard device to an embodiment of the new proposed low power architecture assuming both 256 and 1024 Byte packet lengths. As it can be seen in the figure, the proposed architecture provides very good battery life compared to the standard device. Additionally, the low power architecture is only slightly affected by the increase in payload, in comparison to the standard device where battery life is substantially impacted with longer payloads.

Figure 1D:
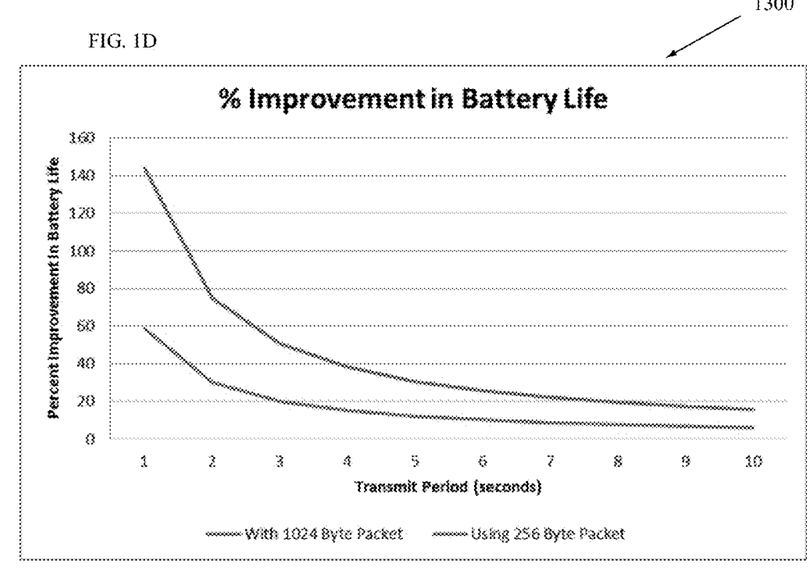
FIG. 1D depicts an embodiment of a percent improvement of battery life for a new low power architecture device from a standard device with 256 and 1024 byte packets.

FIG. 1D depicts an embodiment of a graph 1300 of a percent improvement of battery life for a new low power architecture device from a standard device with 256 and 1024 byte packets. FIG. 1D shows the percentage improvement in battery life between the two approaches with both 256 and 1024 Byte Packets in FIG. 1C. Obviously the most gain is attained where the transmission frequency is higher, since the power consumption is dictated by the sleep power consumption when the transmissions are less frequent. This improvement can be improved with better sleep power saving modes.

Figure 2:
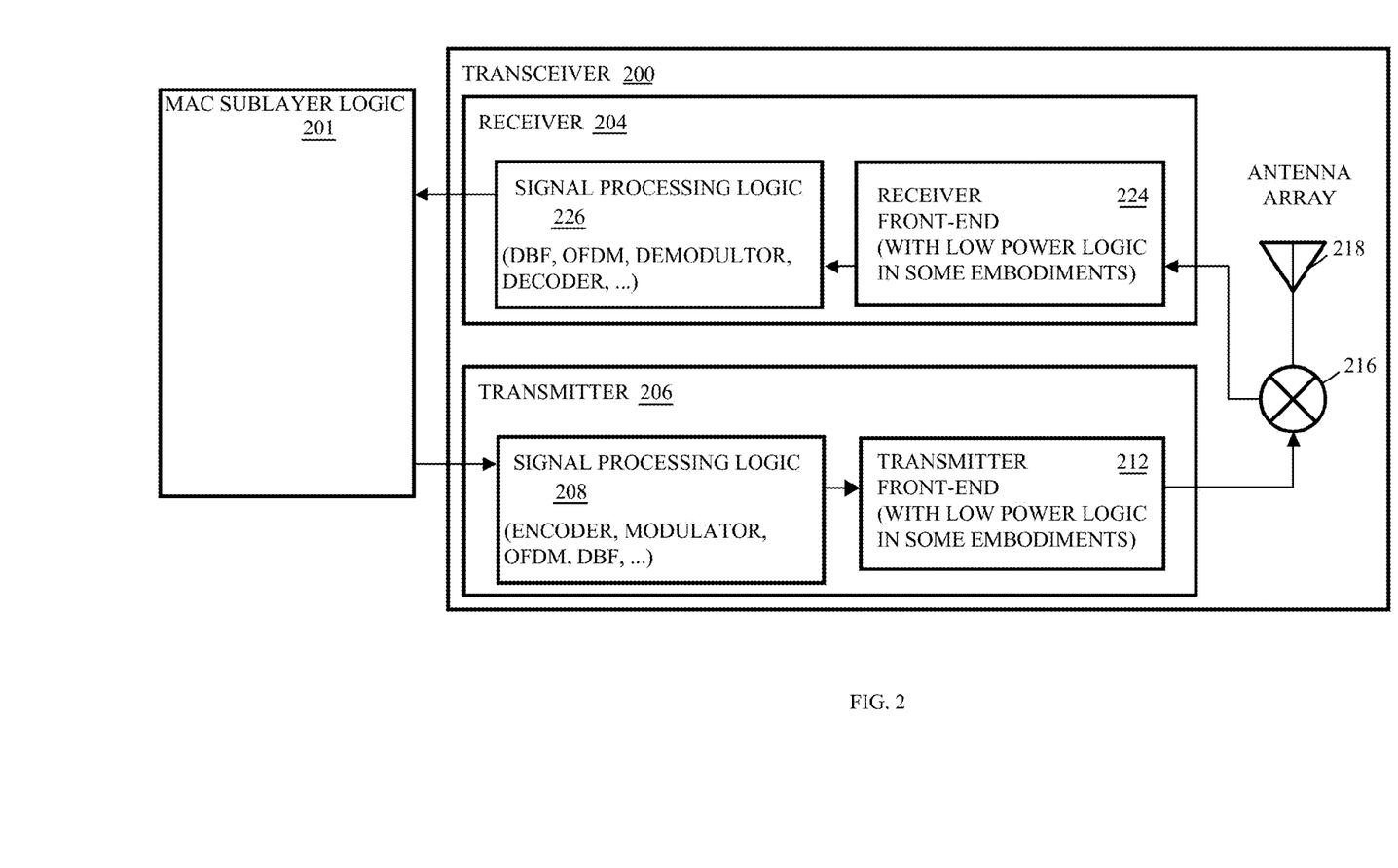
FIG. 2 depicts an embodiment of a new low power architecture device to generate and transmit a short acknowledgement communication in a wireless network.

FIG. 2 illustrates an embodiment of an apparatus to transmit a short acknowledgement communication in a wireless network. The apparatus comprises a transceiver 200 coupled with Medium Access Control (MAC) sublayer logic 201. In general, the MAC sublayer logic 201 may generate a PPDU to transmit via transceiver 200. In the present embodiment, the MAC sublayer logic 201 may transmit an acknowledgement. For instance, MAC sublayer logic 201 may determine that a transmission has been successfully received from a communications device and may instruct the physical layer logic of the transceiver 200 to transmit an acknowledgement to the communications device to acknowledge receipt of the transmission.

The transceiver 200 comprises a receiver 204 and a transmitter 206. The transmitter 206 may comprise signal processing logic 206 and a transmitter front end 212. The signal processing logic 208 comprises circuitry for processing packets such as a physical layer protocol data unit (PPDU) for transmission via the antenna array 218. The signal processing logic 206 may comprise one or more of an encoder, a modulator, an orthogonal frequency division multiplexer (OFDM), a digital beam former (DBF) and/or other signal processing units. The encoder may receive data destined for transmission from the MAC sublayer logic 201. The modulator may receive data from the encoder to transform each block of binary data received from encoder into a unique continuous-time waveform that can be transmitted by an antenna upon up-conversion and amplification. The output of modulator may be fed to an OFDM to impress the modulated data from modulator onto a plurality of orthogonal sub-carriers. And the output of the OFDM may be fed to the DBF to use digital signal processing algorithms that operate on the signals received by, and transmitted from, an array of antenna elements to steer a plurality of spatial channels independently to maximize the signal power transmitted to and received from each of a plurality of user terminals.

In some embodiments, the transmitter 206 may only be capable of a subset of the standard MCS 0 through MCS 7. The transmitter 206 may, for instance, support only single stream that consist of binary phase shift keying (BPSK) with code rate 1/2 using the 2× repetition (henceforward referred to as MCS0 rep 2 mode), an MCS 0 (BPSK, code rate 1/2), an MCS 1 (quadrature phase shift keying (QPSK) with a code rate 1/2) and an MCS 2 (QPSK with a code rate 3/4).

The transmitter front end 212 may couple with the signal processing logic 208 to convert the signal from digital to analog prior to transmitting the signal to a receiver. In the present embodiment, the transmitter front end 212 may operate without a power amplifier and without predistortion circuitry associated with distortion that would have otherwise affected the transmission. In further embodiments, the transmitter front end 212 may operate with less filtering than a standard device and, in some embodiments, the transmitter front end 212 may operate with a lower resolution D/A than a standard device.

In other embodiments, the transmitter front end 212 may comprise low power logic to enter a low power mode of operation in which the power amplifier is bypassed and powered off and the predistortion circuitry is bypassed. In further embodiments, the transmitter front end 212 may reduce the number of stages of filtering and, in some embodiments, the transmitter front end 212 may reduce the resolution of the D/A.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

Antenna array 218 radiates the information bearing signals into a time-varying, spatial distribution of electromagnetic energy that can be received by an antenna of a receiver. The receiver can then extract the information of the received signal. An array of antenna elements can produce multiple spatial channels that can be steered to optimize system performance. Reciprocally, multiple spatial channels in the radiation pattern at a receive antenna can be separated into different spatial channels. Thus, a radiation pattern of antenna array 218 may be highly selective. The antenna array 218 may be implemented using existing printed circuit board metallization technology. Microstrips, striplines, slotlines, and patches, for example, are all candidates for the antenna array 218.

The transceiver 200 may comprise a receiver 204 for receiving, demodulating, and decoding information bearing signals. The receiver 204 may comprise a receiver front end 224. The receiver front end 224 may operate without a low noise amplifier. In some embodiments, the receiver front end 224 may operate a lower resolution A/D than a standard device and may operate with less stages of filtering than a standard device.

In other embodiments, the receiver front end 224 may be capable of bypassing and powering off the low noise amplifier. In some embodiments, the receiver front end 224 may be capable of reducing the stages of filtering. And in further embodiments, the receiver front end 224 may be capable of reducing the resolution of the A/D conversions.

In some embodiments, the signal processing logic 226 may comprise one or more of a DBF, an OFDM, a demodulator and a decoder. The received signals are fed from antenna elements 218 to a DBF. The DBF transforms N antenna signals into L information signals. The output of the DBF is fed to the OFDM. The OFDM extracts signal information from the plurality of subcarriers onto which information-bearing signals are modulated. The demodulator demodulates the received signal. And, the decoder decodes the received data from the demodulator and transmits the decoded information, the MPDU, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), cache, buffers, registers, a reference oscillator, filtering circuitry, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing. The DRAM, cache, buffers, and registers may couple with any component for storing and manipulating data to accomplish data processing discussed herein.

Figure 3A:
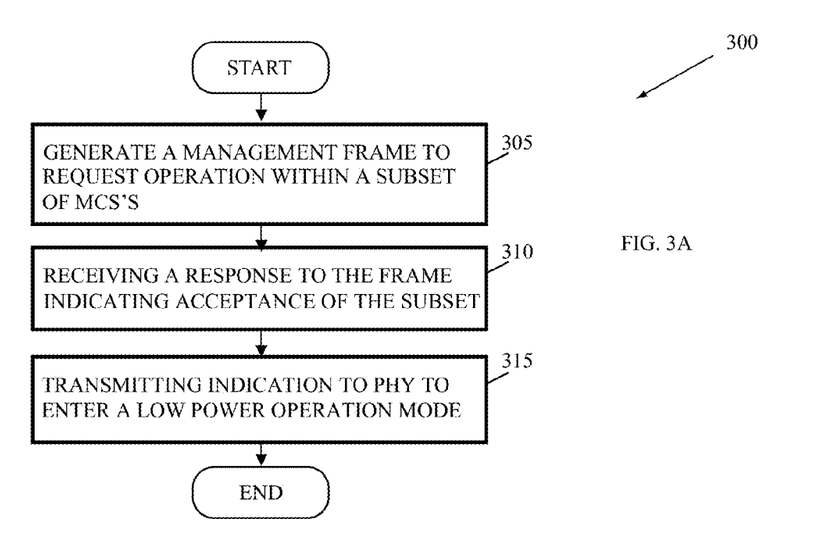
FIGS. 3A-B depict embodiments of flowcharts to transmit and receive an indication to enter a low power mode.
Figure 3B:
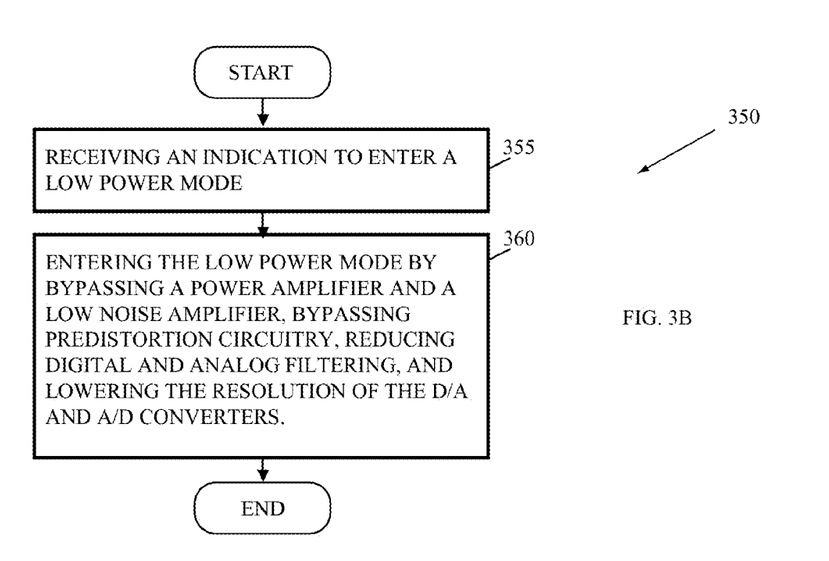

FIGS. 3A-B depict embodiments of flowcharts 300 and 350 to transmit and receive communications with a transmitter and a receiver as illustrated in FIG. 2. Referring to FIG. 3A, the flowchart 300 begins with MAC logic such as MAC sublayer logic 1038 generating a management frame to request operation within a subset of the MCSs 0-7 (element 305). The MAC logic may comprise logic indicating that the preferred mode of operation reduces the set of MCSs to a subset. The MAC logic may then generate the management frame to negotiate the MCS with another communications device.

The MAC logic may receive a response to the management frame indicating an acceptance of restricting the use of MCS to a subset of the MCSs 0-7 (element 310). Upon receiving the acceptance, the MAC logic may transmit an indication to the low power logic in the PHY to inform the low power logic to enter a low power operation mode (element 315). The low power logic may, in response, shut off, bypass circuitry such as the power amplifier in the transmitter front end and the low noise amplifier in the receiver front end. In some embodiments, if the transmitter front end comprises predistortion circuitry, the low power logic may shut down and bypass the predistortion circuitry. In still other embodiments, the low power logic may reduce the power consumption of A/Ds, D/As, and filters in the front end of the receiver and transmitter.

Referring to FIG. 3B, the flowchart 350 begins with a physical layer logic such as physical layer logic 1021 in FIG. 1 receiving an indication from a MAC sublayer logic such as MAC sublayer logic 1018 to enter a low power mode (element 355). The physical layer logic may then go through a process to convert the transmitter and receiver front end to a new low power architecture device by bypassing a power amplifier and a low noise amplifier, bypassing predistortion circuitry, reducing digital and analog filtering, and lowering the resolution of the D/A and A/D converters (element 360).

Figure 4A:
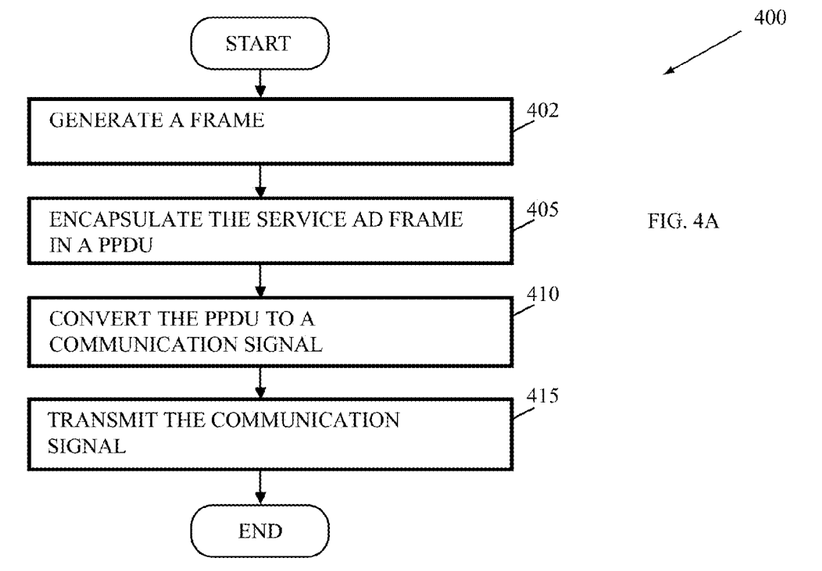
FIGS. 4A-B depict embodiments of flowcharts to transmit and receive communications with a transmitter and a receiver as illustrated in FIG. 2.
Figure 4B:
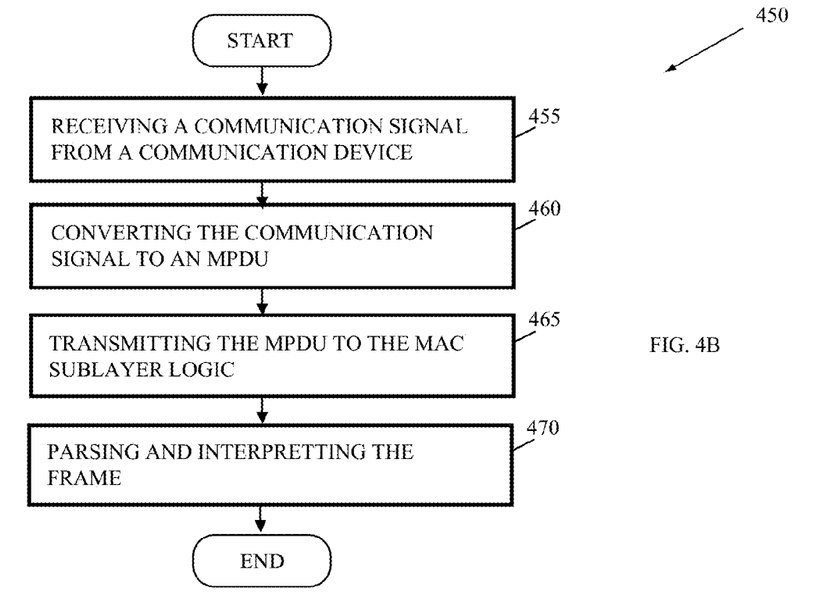

FIGS. 4A-B depict embodiments of flowcharts 400 and 450 to transmit, receive, and interpret or decode communications with a management frame. Referring to FIG. 4A, the flowchart 400 may begin with receiving a frame from the frame builder comprising one or more elements such as a capability element. The MAC sublayer logic of the communications device may generate the frame as a management frame to transmit to a communications device and may pass the frame as an MPDU to a data unit builder that transforms the data into a packet that can be transmitted to a communications device. The data unit builder may generate a preamble to encapsulate one or more of the MPDUs from the frame builder to form a PPDU for transmission (element 405).

The PPDU may then be transmitted to the physical layer device such as the transmitter 206 in FIG. 2 or the transceiver 1020,1040 in FIG. 1 so the PPDU may be converted to a communication signal (element 410). In many embodiments, the transmitter may then transmit the communication signal via the antenna without amplifying the signal with a power amplifier (element 415).

Referring to FIG. 4B, the flowchart 450 begins with a receiver of a station such as the receiver 204 in FIG. 2 receiving a communication signal via one or more antenna(s) such as an antenna element of antenna array 218 (element 455). The receiver may convert the communication signal into one or more MPDUs in accordance with the process described in the preamble without amplifying the signal with a low noise amplifier (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the one or more MPDUs (element 460) and transmits the one or more MPDUs to MAC sublayer logic such as MAC sublayer logic 202 (element 465).

The MAC sublayer logic may decode the frame in each of the MPDUs. For instance, the MAC sublayer logic may parse the frame to determine an affirmative response to a request to limit communications to a subset of MCSs.

The following examples pertain to further embodiments. One example comprises a method. The method may involve receiving a packet to transmit at a transmitter front end; converting the packet to a time domain signal in the transmitter front end; and transmitting the packet from transmit chains of the transmitter front end without amplifying the signal via a power amplifier.

In some embodiments, the method may further comprise transmitting, by an antenna, the packet. In some embodiments, the method may further comprise receiving a signal in the receive chains and converting the signal from the time domain to the frequency domain without amplifying the signal via a low noise amplifier in the receive chains. In several embodiments, the method may further comprise signaling to an access point a capability to support a subset of a standard set of modulation and coding schemes, MCS 0 through MCS 7, wherein the subset comprises modulation and coding schemes MCS 0 through MCS 2. In several embodiments, signaling to the access point the capability to support the subset comprises indicating the capability of supporting MCS 0 rep 2, MCS 0, MCS 1, and MCS 2. In several embodiments, the method may further comprise bypassing the power amplifier in the transmit chains. In some embodiments, the method may further comprise bypassing a low noise amplifier in the receive chains. In some embodiments, the method may further comprise transmitting the packet to request to an access point to limit communications to a subset of a standard set of modulation and coding schemes, MCS 0 through MCS 7, wherein the subset comprises modulation and coding schemes MCS 0 through MCS 2. In some embodiments, the method may further comprise bypassing predistortion circuitry associated with the power amplifier. The method may further comprise powering off stages of digital and analog filters. In some embodiments, the method may further comprise reducing a resolution of a digital-to-analog converter in the transmitter front end. And, in some embodiments, the method may further comprise reducing a resolution of the analog-to-digital converter in a receiver front end.

Another example comprises an apparatus. The apparatus may comprise a signal processing logic; a transmitter front end coupled with the signal processing logic, comprising transmit chains; and logic coupled with the signal processing logic to receive a packet to transmit; convert the packet to a time domain signal in the transmitter front end; and transmit the packet from the transmit chains without amplifying the signal via a power amplifier.

In some embodiments, the apparatus further comprises an antenna coupled with the transmitter front end to transmit the packet. In some embodiments, the apparatus may further comprise receive chains in a receiver front end to receive a signal; convert the signal from a time domain to a frequency domain without amplifying the signal via a low noise amplifier in the receive chains. In some embodiments, the apparatus may further comprise a medium access control logic to signal to an access point a capability to support a subset of a standard set of modulation and coding schemes, MCS 0 through MCS 7, wherein the subset comprises modulation and coding schemes MCS 0 through MCS 2. In some embodiments, the medium access control logic comprises logic to indicate the capability of supporting MCS 0 rep 2, MCS 0, MCS 1, and MCS 2. In some embodiments, the apparatus may further comprise logic to bypass the power amplifier in the transmit chains. In some embodiments, the apparatus may further comprise logic to bypass a low noise amplifier in the receive chains. In some embodiments, the apparatus may further comprise a medium access control logic to transmit the packet to request to an access point to limit communications to a subset of a standard set of modulation and coding schemes, MCS 0 through MCS 7, wherein the subset comprises modulation and coding schemes MCS 0 through MCS 2. In some embodiments, the apparatus may further comprise logic to bypass predistortion circuitry associated with the power amplifier. In some embodiments, the apparatus may further comprise logic to power off stages of digital and analog filters. In some embodiments, the apparatus may further comprise logic to reduce a resolution of a digital-to-analog converter in the transmitter front end. And, in some embodiments, the apparatus may further comprise logic to reduce a resolution of the analog-to-digital converter in a receiver front end.

Another example comprises a system. The system may comprise memory a signal processing logic; a transmitter front end coupled with the signal processing logic, comprising transmit chains; and logic coupled with the signal processing logic to receive a packet to transmit; convert the packet to a time domain signal in the transmitter front end; and transmit the packet from the transmit chains without amplifying the signal via a power amplifier; and an antenna to transmit the transmission.

One example comprises a machine-accessible product. The machine-accessible product may comprise a medium containing instructions, wherein the instructions, when executed by a device, causes the device to perform operations, the operations comprising receiving an indication to transmit a first type transmission; selecting a first long training sequence to generate the first type transmission, wherein the first long training sequence is associated with the first type transmission in a first bandwidth mode of operation and a second long training sequence is associated with a second type transmission in the first bandwidth mode of operation; and transmitting the first type transmission to an antenna for transmission.

One example comprises a method. The method may involve receiving a transmission comprising a first long training sequence, wherein the first long training sequence is associated with the first type transmission in a first bandwidth mode of operation and a second long training sequence is associated with a second type transmission in the first bandwidth mode of operation; and correlating the first long training sequence to identify the first long training sequence is associated with the first type transmission in the first bandwidth mode of operation.

In some embodiments, the method may further comprise determining an expected packet and determining if the transmission comprises the expected packet based upon a comparison with an expected long training sequence, wherein the expected long training sequence comprises the first long training sequence or the second long training sequence. In some embodiments, transmitting an indication of receipt of the first type transmission to a medium access control sublayer logic. In several embodiments, transmitting the indication of receipt comprises transmitting the indication of receipt of a short packet. In several embodiments, transmitting the indication of receipt comprises transmitting the indication of receipt of a short acknowledgement with a short training field sequence and the first long training field sequence. In several embodiments, receiving the transmission comprises receiving the transmission via an antenna array. And, in some embodiments, correlating the first long training sequence comprises classifying the transmission as the first bandwidth mode of operation based upon the differentially orthogonal properties of the first long training sequence and the second long training sequence being differentially orthogonal to each other and differentially orthogonal to half of a third long training sequence for transmissions in a second bandwidth mode of operation.

Another example comprises an apparatus. The apparatus may comprise a signal processing logic; and correlation logic coupled with the signal processing logic to receive a transmission comprising a first long training sequence, wherein the first long training sequence is associated with the first type transmission in a first bandwidth mode of operation and a second long training sequence is associated with a second type transmission in the first bandwidth mode of operation; and correlate the first long training sequence to identify the first long training sequence is associated with the first type transmission in the first bandwidth mode of operation.

In some embodiments, the apparatus further comprises an antenna coupled with the correlation logic to receive the transmission. In some embodiments, the apparatus further comprising memory coupled with the correlation logic to store more than two long training sequences associated with the first bandwidth mode of operation, wherein each of the more than two long training sequences is associated with different type transmission. In some embodiments, the correlation logic comprises logic to transmit an indication of receipt of the first type transmission to a medium access control sublayer logic. In some embodiments, the logic to transmit the indication of receipt comprises logic to transmit the indication of receipt of a short packet. In some embodiments, the logic to transmit the indication of receipt comprises logic to transmit the indication of receipt of a short acknowledgement with a short training field sequence and the first long training field sequence. And, in some embodiments, the correlation logic comprises a frequency domain, differential detector to classify the transmission as the first bandwidth mode of operation based upon the differentially orthogonal properties of the first long training sequence and the second long training sequence being differentially orthogonal to each other and differentially orthogonal to half of a third long training sequence for transmissions in a second bandwidth mode of operation.

Another example comprises a system. The system may comprise memory to store an intercept multiplier value; a signal processing logic; and correlation logic coupled with the signal processing logic to receive a transmission comprising a first long training sequence, wherein the first long training sequence is associated with the first type transmission in a first bandwidth mode of operation and a second long training sequence is associated with a second type transmission in the first bandwidth mode of operation; and correlate the first long training sequence to identify the first long training sequence is associated with the first type transmission in the first bandwidth mode of operation.

One example comprises a machine-accessible product. The machine-accessible product may comprise a medium containing instructions to signal an access point to limit modulation and coding schemes, wherein the instructions, when executed by the access point, causes the access point to perform operations, the operations comprising: signaling to an access point a capability to support a subset of a standard set of modulation and coding schemes, MCS 0 through MCS 7, wherein the subset comprises modulation and coding schemes MCS 0 through MCS 2; receiving an indication from the access point of adoption of the subset for communications; and transmitting an indication to low power logic to enter a low power mode.

In some embodiments, signaling to the access point the capability to support the subset comprises indicating the capability of supporting MCS 0 rep 2, MCS 0, MCS 1, and MCS 2. In some embodiments, the logic to transmit the indication of receipt comprises logic to transmit the indication of receipt of a short acknowledgement with a short training field sequence and the first long training field sequence. And, in some embodiments, the operations further comprise transmitting the packet to request to an access point to limit communications to a subset of a standard set of modulation and coding schemes, MCS 0 through MCS 7, wherein the subset comprises modulation and coding schemes MCS 0 through MCS 2.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method comprising:
    signaling to an access point modulation and coding scheme capabilities;
    signaling to the access point a preference to operate within a subset of a standard set of modulation and coding schemes;
    receiving an acknowledgement from the access point responsive to signaling modulation and coding scheme capabilities and the preference;
    receiving a wireless communication packet to transmit at a transmitter front end;
    converting the packet to a time-domain signal in the transmitter front end; and
    transmitting the packet wirelessly from transmit chains of the transmitter front end, wherein the transmitting does not involve amplification of the packet via a power amplifier in the transmit chains, and wherein transmitting comprises reducing a resolution of digital-to-analog converter to convert the packet in the transmitter front end.

2. The method of claim 1, further comprising transmitting, by an antenna, the packet.

3. The method of claim 1, further comprising receiving a time-domain signal in receive chains of a receiver front end and converting the time-domain signal to a frequency-domain signal, wherein the receiving does not involve amplification of the packet via a low noise amplifier in the receive chains.

4. The method of claim 1, further comprising signaling to an access point a capability to support a subset of a standard set of modulation and coding schemes, MCS 0 through MCS 7, wherein the subset comprises modulation and coding schemes MCS 0 through MCS 2.

5. The method of claim 4, wherein signaling to the access point the capability to support the subset comprises indicating the capability of supporting MCS0 rep 2, MCS 0, MCS 1, and MCS 2.

6. The method of claim 1, further comprising bypassing the power amplifier in the transmit chains.

7. The method of claim 1, further comprising bypassing a low noise amplifier in receive chains of a receiver front end.

8. The method of claim 1, further comprising transmitting the packet to request to an access point to limit communications to a subset of a standard set of modulation and coding schemes, MCS 0 through MCS 7, wherein the subset comprises modulation and coding schemes MCS 0 through MCS 2.

9. The method of claim 1, further comprising bypassing predistortion circuitry for the power amplifier.

10. The method of claim 1, further comprising powering off stages of digital and analog filters.

11. A device comprising:
a signal processing logic;
a transmitter front end coupled with the signal processing logic, comprising transmit chains, wherein the transmit chains comprise circuitry; and
logic coupled with the signal processing logic to signal to an access point modulation and coding schemes capabilities; signal to the access point a preference to operate within a subset of a standard set of modulation and coding schemes; receive an acknowledgement from the access point responsive to the signaling modulation and coding scheme capabilities and the preference; receive a packet to transmit; convert the packet to a time-domain signal in the transmitter front end; reduce a resolution of digital-to-analog converter for conversion of the packet from digital to analog in the transmitter front end; and transmit the packet wirelessly from the transmit chains, wherein the transmission of the packet does not involve amplification of the packet via a power amplifier in the transmit chains.

12. The device of claim 11, further comprising an antenna array coupled with the transmitter front end to transmit the packet.

13. The device of claim 11, further comprising receive chains in a receiver front end to receive a time-domain signal; convert the time-domain signal to a frequency domain without amplification via a low noise amplifier in the receive chains.

14. The device of claim 11, further comprising a medium access control logic to signal to an access point a capability to support a subset of a standard set of modulation and coding schemes, MCS 0 through MCS 7, wherein the subset comprises modulation and coding schemes MCS 0 through MCS 2.

15. The device of claim 11, wherein the medium access control logic comprises logic to indicate a capability of supporting MCS0 rep 2, MCS 0, MCS 1, and MCS 2.

16. The device of claim 11, further comprising logic to bypass the power amplifier in the transmit chains.

17. The device of claim 11, further comprising logic to bypass a low noise amplifier in receive chains of a receiver front end.

18. The device of claim 11, further comprising a medium access control logic to transmit the packet to request to an access point to limit communications to a subset of a standard set of modulation and coding schemes, MCS 0 through MCS 7, wherein the subset comprises modulation and coding schemes MCS 0 through MCS 2.

19. The device of claim 11, further comprising logic to bypass predistortion circuitry for the power amplifier.

20. The device of claim 11, further comprising logic to power off stages of digital and analog filters.

21. A machine-accessible product comprising:
a non-transitory medium containing instructions to signal an access point to limit modulation and coding schemes, wherein the instructions, when executed by a station, causes the station to perform operations, the operations comprising:
signaling to the access point modulation and coding scheme capabilities;
signaling to the access point a preference to operate within a subset of the standard set of modulation and coding schemes, MCS 0 through MCS 7, wherein the subset comprises modulation and coding schemes MCS 0 through MCS 2;
receiving an indication from the access point of adoption of the subset for communications; and
transmitting the indication to low power logic to enter a low power mode.

22. The machine-accessible product of claim 21, wherein signaling to the access point the capability to support the subset comprises indicating the capability of supporting MCS0 rep 2, MCS 0, MCS 1, and MCS 2.

23. The machine-accessible product of claim 21, wherein transmitting the indication to low power logic to enter a low power mode comprises bypassing a power amplifier in a transmit front end and bypassing a low noise amplifier in a receiver front end.

* * * * *